July 20, 1965
C. A. OLBRICH
3,195,843
SUPPORT BRACKET
Filed Sept. 24, 1963
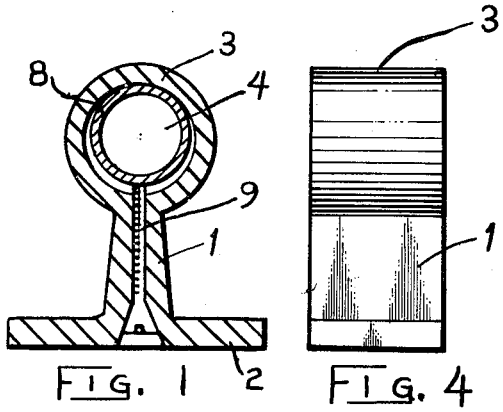
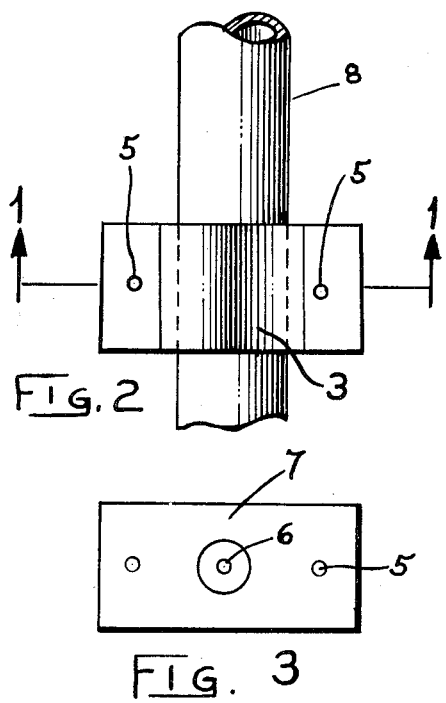
INVENTOR.
CYRIL A. OLBRICH
BY John P. Murphy
ATTORNEY 3,195,843
SUPPORT BRACKET
Cyril A. Olbrich, Auburn, N.Y., assignor to Nautalloy Products, Inc., Auburn, N.Y., a corporation of New York
Filed Sept. 24, 1963, Ser. No. 311,019
3 Claims. (Cl. 248—74)

This invention relates to support fixtures and more particularly to fixtures of extruded metal for use as marine hardware.

Heretofore, it has long been common in the art to produce support members, especially for marine applications by means of die castings. Disadvantages with such products, and the production thereof, were many. It was most difficult to produce a multiplicity of units, each having identical dimensions, and with closely similar mechanical properties. Secondly, it was difficult to produce a fixture with a thin cross section, and yet capable of supporting large loads.

It is, thus, an object of the present invention to provide a multiplicity of fixtures having closely similar dimensions. A further object is to provide a multiplicity of support fixtures having closely similar mechanical properties. A still further object of the present invention is to provide a fixture with a thin cross section and yet capable of sustaining large loads for extended periods of time. Other objects will appear hereinafter.

These objects are accomplished by the following invention wherein an extruded metal bar is cut into desired lengths and finally machined into a desired support fixture.

Illustrative of the above are FIGS. 1 thru 4.

FIG. 1 depicts an end view of one example of my invention.

FIG. 2 depicts a top view of a support fixture.

FIG. 3 depicts a bottom view of a support fixture.

FIG. 4 depicts a side view of a support fixture.

As shown in FIGS. 1 thru 4, the support fixture consists fundamentally of mounting flanges 2, a shank portion 1 and a support body 3. All of these portions are formed continuously with one another, that is to say the flange portions 2, shank portion 1 and support body 3 are manufactured together from a single metal extrusion as can be seen most advantageously in FIG. 1. Flange portions 2 are provided with holes 5 which allow a screw or some other fastening device (not shown) to affix the support fixture in a desired position to a main body. Shank 1 serves to position the support body 3 in a desired position away from the main body to which flange portions 2 are attached. The support body 3 itself serves to hold a rod or some other member in the following manner. A rod 8 is passed through the body 3 as shown in FIG. 2. When rod 8 is in a desired position, a set screw 9 serves to accurately hold rod 8 to support body 3, as seen in FIG. 1. Set screw 9 resides within a tapped and threaded cavity 6 of shank portion 1. To allow the flange portions 2 to reside flush with a main body, the cavity 6 is countersunk such that set screw 9 is below the bottom surface of the flange portions 2.

In the manufacturing process of the above device, I have found that an extruded aluminum alloy is most advantageously used. Extrusion is the process of forcing material in a plastic condition through a suitable orifice in order to produce continuously a body of a desired uniform cross section. In this case, a billet of an aluminum alloy is put in a closed vessel within a horizontal cam, said billet heated, generally in a reducing or inert atmosphere, to render the billet in a plastic state. The cam is then advanced to create pressure on the billet. Between the cam and the billet is interposed a dummy of a size slightly less than that of the container so that the oxidized surface of the billet will remain undisturbed. As pressure is exerted on the cam, a continuous body emerges through the orifice with a constant cross section. The extruded bar is then further processed by being cut into a desired number of lengths to produce a rough blank for the support member. Further machining, including boring and tapping holes 5 and 6, and final polish of the whole article, produces a completed fixture.

Extrusion produces a most advantageous produce. Because of the high pressure under which the metal is extruded, the metal's structure becomes more compact and its strength is increased. Thus, an article with a much smaller cross section can support the same load as would require a large cross section of a die cast article. Not only is weight reduced where a large number of these fixtures are used, but shock absorbing capacity is increased since a thinner cross section allows increased flexibility under shock loads.

The most prominent application of the above device seems to lie in the field of marine hardware. In this application, the above device possesses many distinct advantages stated above. Also, the aluminum alloy renders the article non-corrosive under attack of saline sea water, and the possibility of thin cross sections enables the support to blend pleasingly with a supported bow rail to produce a functional yet attractive device.

It will be appreciated that many modifications of the above device are possible in the flange configuration 2, the support shank 1, and the support body 3. The flange portions 2 may be produced to adapt with a concave or convex surface, and may have a plurality of holes 5 as may be required. The support body 3 similarly may be adapted to accommodate a variety of differently shaped rods 8, etc. The round cylindrical body as shown in FIG. 1 may be instead a complex enclosed cylinder to hold an unusual shaped object. I would not like to be limited in any manner to the example shown in the drawings, but claim broadly all devices that fall under the scope of my invention as described in the following appended claims.

I claim:

1. A support body of extruded metal comprising base flange portions, a connecting shank and support, said support body having a bore disposed therein of substantially cylindrical shape, the thickness of said shank being less than the exterior diameter of said support body, said shank and support body containing a threaded hole to accommodate a threaded set screw, the axis of said hole being substantially perpendicular to the axis of said bore, and a set screw disposed within said threaded hole and adapted to bear against a pipe supported within said bore.

2. A support fixture as defined in claim 1, said connecting shank having a thickness less than one-half the overall diameter of said cylindrical support body.

3. A support fixture as defined in claim 1, wherein said extruded metal is aluminum.

References Cited by the Examiner

UNITED STATES PATENTS

| | | | |
|---|---|---|---|
| 651,186 | 6/00 | Hague | 248—74 |
| 2,111,357 | 3/38 | Cornell | 248—59 |
| 2,359,209 | 9/44 | Ellinwood | 248—74 |
| 2,961,210 | 11/60 | Pfoff et al. | 248—74 |
| 3,022,028 | 2/62 | Reinhard et al. | 248—23 |

FOREIGN PATENTS

| | | |
|---|---|---|
| 160,319 | 4/41 | Austria. |
| 907,141 | 3/54 | Germany. |
| 116,748 | 6/18 | Great Britain. |
| 816,709 | 7/59 | Great Britain. |

CLAUDE A. LE ROY, *Primary Examiner.*